(12) United States Patent
Hemmat

(10) Patent No.: US 8,538,767 B1
(45) Date of Patent: Sep. 17, 2013

(54) METHOD FOR DISCOVERING FUNCTIONAL AND SYSTEM REQUIREMENTS IN AN INTEGRATED DEVELOPMENT PROCESS

(75) Inventor: Merzad Hemmat, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1604 days.

(21) Appl. No.: 10/643,334

(22) Filed: Aug. 18, 2003

Related U.S. Application Data (60) Provisional application No. 60/404,824, filed on Aug. 19, 2002.

(51) Int. Cl.
*G06Q 10/00* (2012.01)

(52) U.S. Cl.
USPC .......................................................... 705/1.1

(58) Field of Classification Search
USPC .............................................. 705/1, 1.1, 500
See application file for complete search history.

(56) References Cited

U.S. PATENT DOCUMENTS

| | | | |
|---|---|---|---|
| 5,208,765 A | 5/1993 | Turnbull | |
| 5,548,506 A | 8/1996 | Srinivasan | |
| 5,557,515 A | 9/1996 | Abbruzzese et al. | |
| 5,692,125 A | 11/1997 | Schloss et al. | |
| 5,729,746 A | 3/1998 | Leonard | |
| 5,758,328 A | 5/1998 | Giovannoli | |
| 5,765,140 A | 6/1998 | Knudson et al. | |
| 5,784,539 A | 7/1998 | Lenz | |
| 5,815,152 A | 9/1998 | Collier et al. | |
| 5,848,393 A | 12/1998 | Goodridge et al. | |
| 5,864,480 A | 1/1999 | Ladd | |
| 5,893,074 A | 4/1999 | Hughes et al. | |
| 5,930,798 A | 7/1999 | Lawler et al. | |
| 5,949,999 A | 9/1999 | Song et al. | |
| 5,960,200 A | 9/1999 | Eager et al. | |
| 5,974,392 A | 10/1999 | Endo | |
| 5,999,908 A | 12/1999 | Abelow | |
| 6,011,917 A * | 1/2000 | Leymann et al. | 717/104 |
| 6,289,502 B1 * | 9/2001 | Garland et al. | 717/104 |
| 6,324,647 B1 | 11/2001 | Bowman-Amuah | |
| 6,405,364 B1 | 6/2002 | Bowman-Amuah | |
| 6,424,948 B1 | 7/2002 | Dong et al. | |
| 6,505,176 B2 | 1/2003 | DeFrancesco, Jr. et al. | |

(Continued)

OTHER PUBLICATIONS

Department of Defense—Systems Management College, Systems Engineering Fundamentals, Jan. 2001, Defense Acquisition University Press, pp. 1-222.*

(Continued)

*Primary Examiner* — Jonathan Ouellette
*Assistant Examiner* — Michael Thompson (57) ABSTRACT

A method for developing a response to a business need that has been initially reduced to a concept and approved for additional development after an initial estimate. The method can consist of capturing functional requirements to implement the defined concept through interaction with end users of the potentially impacted business processes. After the functional requirements have been captured, system requirements, including requirements for potential automation and software systems supporting the impacted business processes, can be captured. System requirements can be captured through interaction with systems analysts for the potentially impacted automation and software systems supporting the impacted business processes. A set of business requirements can be identified with respect to the approved concept and every captured functional requirement can be mapped to one or more identified business requirements. Every captured system requirement can be mapped to one or more captured functional requirements.

21 Claims, 4 Drawing Sheets

(56) References Cited

U.S. PATENT DOCUMENTS

| | | | |
|---|---|---|---|
| 6,519,571 B1 | 2/2003 | Guheen et al. |
| 6,574,605 B1 | 6/2003 | Sanders et al. |
| 6,601,234 B1 | 7/2003 | Bowman-Amuah |
| 6,636,585 B2 | 10/2003 | Salzberg et al. |
| 6,658,643 B1 | 12/2003 | Bera |
| 6,662,357 B1 | 12/2003 | Bowman-Amuah |
| 6,671,818 B1 | 12/2003 | Mikurak |
| 6,684,191 B1 | 1/2004 | Barnard et al. |
| 6,694,329 B2 | 2/2004 | Murray |
| 6,721,713 B1 | 4/2004 | Guheen et al. |
| 6,732,028 B2 | 5/2004 | Vanstory et al. |
| 6,799,145 B2 | 9/2004 | Kennedy et al. |
| 6,832,202 B1 | 12/2004 | Schuyler et al. |
| 6,865,565 B2 | 3/2005 | Rainsberger et al. |
| 6,904,593 B1 | 6/2005 | Fong et al. |
| 6,961,687 B1 | 11/2005 | Myers, Jr. et al. |
| 6,964,044 B1 | 11/2005 | Hudson et al. |
| 6,973,640 B2 | 12/2005 | Little et al. |
| 6,990,437 B1 | 1/2006 | Abu El Ata |
| 7,047,518 B2 | 5/2006 | Little et al. |
| 7,051,036 B2 | 5/2006 | Rosnow et al. |
| 7,092,968 B1 | 8/2006 | Ebel et al. |
| 7,101,031 B2 | 9/2006 | Medin |
| 7,139,999 B2 | 11/2006 | Bowman-Amuah |
| 7,162,427 B1 | 1/2007 | Myrick et al. |
| 7,212,987 B2 | 5/2007 | Swanke et al. |
| 7,240,325 B2 | 7/2007 | Keller |
| 7,292,990 B2 | 11/2007 | Hughes |
| 7,321,864 B1 | 1/2008 | Gendler |
| 7,330,822 B1 | 2/2008 | Robson et al. |
| 7,350,185 B2 | 3/2008 | Sparago et al. |
| 7,360,201 B2 | 4/2008 | Srivastava |
| 7,389,217 B2 | 6/2008 | Benny et al. |
| 7,395,540 B2 | 7/2008 | Rogers |
| 7,403,948 B2 | 7/2008 | Ghoneimy et al. |
| 7,430,498 B2 | 9/2008 | Butterfield et al. |
| 7,475,107 B2 | 1/2009 | Maconi et al. |
| 7,487,079 B2 | 2/2009 | Benny et al. |
| 7,490,319 B2 | 2/2009 | Blackwell et al. |
| 7,559,049 B1 | 7/2009 | Hemmat et al. |
| 7,631,297 B2 | 12/2009 | Childress et al. |
| 7,640,531 B1 | 12/2009 | Akram et al. |
| 7,653,592 B1 | 1/2010 | Flaxman et al. |
| 7,664,664 B2 | 2/2010 | King et al. |
| 7,685,013 B2 | 3/2010 | Gendler |
| 7,685,604 B2 | 3/2010 | Baartman et al. |
| 7,716,073 B1 | 5/2010 | Martin |
| 7,849,438 B1 | 12/2010 | Hemmat et al. |
| 7,865,867 B2 | 1/2011 | Keene Potter et al. |
| 7,930,201 B1 | 4/2011 | Issa et al. |
| 2002/0026630 A1 | 2/2002 | Schmidt et al. |
| 2002/0032596 A1 | 3/2002 | Ohsaki et al. |
| 2002/0042731 A1 | 4/2002 | King, Jr. et al. |
| 2002/0046394 A1* | 4/2002 | Do et al. | 717/108 |
| 2002/0049816 A1* | 4/2002 | Costin et al. | 709/206 |
| 2002/0059512 A1* | 5/2002 | Desjardins | 713/1 |
| 2002/0087381 A1 | 7/2002 | Freeman et al. |
| 2002/0147801 A1 | 10/2002 | Gullotta et al. |
| 2003/0018952 A1 | 1/2003 | Roetzheim |
| 2003/0023675 A1 | 1/2003 | Ouchi et al. |
| 2003/0033191 A1 | 2/2003 | Davies et al. |
| 2003/0050812 A1 | 3/2003 | Clark, III et al. |
| 2003/0055811 A1 | 3/2003 | Stork et al. |
| 2003/0061266 A1 | 3/2003 | Ouchi |
| 2003/0110067 A1 | 6/2003 | Miller et al. |
| 2003/0145124 A1* | 7/2003 | Guyan et al. | 709/318 |
| 2003/0171970 A1 | 9/2003 | Kinsella |
| 2003/0181991 A1 | 9/2003 | Chau et al. |
| 2004/0002883 A1 | 1/2004 | Andrews et al. |
| 2004/0030421 A1* | 2/2004 | Haley | 700/49 |
| 2004/0039629 A1 | 2/2004 | Hoffman et al. |
| 2004/0098154 A1 | 5/2004 | McCarthy |
| 2004/0111430 A1 | 6/2004 | Hertling et al. |
| 2004/0143477 A1 | 7/2004 | Wolff |
| 2004/0143811 A1 | 7/2004 | Kaelicke et al. |
| 2004/0148183 A1 | 7/2004 | Sadiq |
| 2004/0162741 A1 | 8/2004 | Flaxer et al. |
| 2004/0172445 A1 | 9/2004 | Singh et al. |
| 2004/0215544 A1 | 10/2004 | Formale et al. |
| 2005/0004825 A1 | 1/2005 | Ehrler et al. |
| 2005/0027585 A1 | 2/2005 | Wodtke et al. |
| 2005/0027733 A1 | 2/2005 | Donahue |
| 2005/0114829 A1 | 5/2005 | Robin et al. |
| 2005/0137920 A1 | 6/2005 | O'Connor et al. |
| 2006/0031078 A1 | 2/2006 | Pizzinger et al. |
| 2006/0047555 A1 | 3/2006 | Kang et al. |
| 2006/0059423 A1 | 3/2006 | Lehmann et al. |
| 2006/0106627 A1 | 5/2006 | Al-Nujaidi |
| 2006/0173908 A1 | 8/2006 | Browning et al. |
| 2006/0235732 A1 | 10/2006 | Miller et al. |
| 2007/0179790 A1 | 8/2007 | Leitch et al. |
| 2007/0276674 A1 | 11/2007 | Hemmat |
| 2008/0319816 A1 | 12/2008 | Benny et al. |
| 2009/0320088 A1 | 12/2009 | Gill et al. |

OTHER PUBLICATIONS

Hemmat, Merzad, et al., Patent Application entitled, "Enterprise Software Development Process for Outsourced Developers," filed May 27, 2004, U.S. Appl. No. 10/857,287.

Hindman, Leslie Shannon et al., Patent Application entitled, "Tool and Method for Work Authorization in an Outsourced EDP Process," filed May 2, 2005, U.S. Appl. No. 11/120,224.

Office Action dated Dec. 1, 2005, 16 pages, U.S. Appl. No. 10/429,615, filed May 5, 2003.

Final Office Action dated Apr. 18, 2006, 16 pages, U.S. Appl. No. 10/429,615, filed May 5, 2003.

Office Action dated Jan. 4, 2007, 14 pages, U.S. Appl. No. 10/429,615, filed May 5, 2003.

Final Office Action dated Sep. 10, 2007, 22 pages, U.S. Appl. No. 10/429,615, filed May 5, 2003.

Office Action dated Feb. 21, 2007, 22 pages, U.S. Appl. No. 10/643,419, filed Aug. 19, 2003.

Final Office Action dated Aug. 1, 2007, 25 pages, U.S. Appl. No. 10/643,419, filed Aug. 19, 2003.

Hemmat, et al., Provisional Patent Application entitled, "Enterprise Architecture Development Process," filed Aug. 19, 2002, U.S. Appl. No. 60/404,824.

Issa, Philip, et al., Patent Application entitled, "EDP Portal Cross-Process Integrated View," filed Aug. 19, 2003, U.S. Appl. No. 10/643,417.

Brandes, Tracy, et al., Patent Application entitled, "Change Request Processing in an Enterprise Development Process," filed Aug. 19, 2003, U.S. Appl. No. 10/643,418.

Issa, Philip, et al., Patent Application entitled, "Integrated Software Implementation of Enterprise Development Process," filed Aug. 19, 2003, U.S. Appl. No. 10/643,419.

Hemmat, Merzad, et al., Patent Application entitled, "Integrated Advance Scheduling of Indeterminate Projects in an Integrated Development Process", filed Dec. 8, 2003, U.S. Appl. No. 10/730,601.

Advisory Action dated Nov. 17, 2009, 17 pages, U.S. Appl. No. 11/248,342, filed Oct. 12, 2005.

Final Office Action dated Oct. 26, 2009, 30 pages, U.S. Appl. No. 11/213,239, filed Aug. 12, 2005.

Office Action dated Oct. 27, 2009, 15 pages, U.S. Appl. No. 10/643,418.

Office Action dated Oct. 29, 2009, 14 pages, U.S. Appl. No. 11/181,154.

"Enterprise Resource Planning (EPR) Project," University of Florida, Jan. 2003, pp. 1-25, www.bridges.ufl.edu/implementation/teams/processes/EPR-Project-Work-Policies-draft-v6.pdf.

Notice of Panel Decision dated Oct. 13, 2009 14 pages, U.S. Appl. No. 10/429,615, filed May 5, 2003.

Arredondo, Barbara, et al., Patent Application entitled, "Small Enhancement Process Workflow Manager," filed Jul. 14, 2005, U.S. Appl. No. 11/181,154.

Higgins, Gregory, et al., Patent Application entitled, "Multiple Conditional Pipeline Process Architecture," filed Sep. 14, 2005, U.S. Appl. No. 11/226,121.

Hemmat, Merzad, et al., Patent Application entitled, "Streamlined discover-Design Initiative," filed Jan. 19, 2005, U.S. Appl. No. 11/038,598.
Arredondo, Barbara, et al., Patent Application entitled, "System and Method for Managing Enterprise Services Projects," filed Oct. 12, 2005, U.S. Appl. No. 11/248,342.
Bray Curtis A., et al., Patent Application entitled, "Technology Assessment and Selection in Enterprise Development Process," filed Aug. 26, 2005, U.S. Appl. No. 11/213,239.
Office Action dated Mar. 30, 2007, 16 pages, U.S. Appl. No. 10/730,601, filed Dec. 8, 2003.
Final Office Action dated Sep. 20, 2007, 15 pages, U.S. Appl. No. 10/730,601, filed Dec. 8, 2003.
Advisory Action dated Dec. 27, 2007, 3 pages, U.S. Appl. No. 10/730,601, filed Dec. 8, 2003.
Office Action dated Apr. 29, 2008, 18 pages, U.S. Appl. No. 10/730,601, filed Dec. 8, 2003.
Final Office Action dated Oct. 28, 2008, 16 pages, U.S. Appl. No. 10/730,601, filed Dec. 8, 2003.
Notice of Allowance dated Mar. 13, 2009, 12 pages, U.S. Appl. No. 10/730,601, filed Dec. 8, 2003.
Office Action dated Jan. 22, 2008, 9 pages, U.S. Appl. No. 10/643,417, filed Aug. 19, 2003.
Office Action dated Apr. 2, 2008, 17 pages, U.S. Appl. No. 10/643,417, filed Aug. 19, 2003.
Final Office Action dated Oct. 17, 2008, 19 pages, U.S. Appl. No. 10/643,417, filed Aug. 19, 2003.
Advisory Action dated Jan. 26, 2009, 3 pages, U.S. Appl. No. 10/643,417, filed Aug. 19, 2003.
Office Action dated May 27, 2009, 22 pages, U.S. Appl. No. 10/643,417, filed Aug. 19, 2003.
Office Action dated Sep. 23, 2008, 13 pages, U.S. Appl. No. 10/643,418.
Final Office Action dated Apr. 1, 2009, 14 pages, U.S. Appl. No. 10/643,418.
Advisory Action dated Jul. 7, 2009, 3 pages, U.S. Appl. No. 10/643,418.
Advisory Action dated Nov. 13, 2007, 7 pages, U.S. Appl. No. 10/643,419, filed Aug. 19, 2003.
Notice of Abandonment dated Mar. 17, 2008, 2 pages, U.S. Appl. No. 10/643,419, filed Aug. 19, 2003.
Office Action dated Apr. 10, 2009, 22 pages, U.S. Appl. No. 10/857,287, filed May 27, 2004.
Final Office Action dated Sep. 15, 2009, 8 pages, U.S. Appl. No. 10/857,287, filed May 27, 2004.
Office Action dated Aug. 17, 2009, 26 pages, U.S. Appl. No. 11/120,224, filed May 2, 2005.
Office Action dated Aug. 4, 2009, 22 pages, U.S. Appl. No. 11/226,121, filed Sep. 14, 2005.
Office Action dated Aug. 3, 2009, 28 pages, U.S. Appl. No. 11/038,598, filed Jan. 19, 2005.
Office Action dated Aug. 18, 2008, 25 pages, U.S. Appl. No. 11/248,342, filed Oct. 12, 2005.
Office Action dated Feb. 19, 2009, 22 pages, U.S. Appl. No. 11/248,342, filed Oct. 12, 2005.
Final Office Action dated Sep. 3, 2009, 19 pages, U.S. Appl. No. 11/248,342, filed Oct. 12, 2005.
Office Action dated Apr. 30, 2009, 21 pages, U.S. Appl. No. 11/213,239, filed Aug. 12, 2005.
Office Action dated Jan. 7, 2010, 42 pages, U.S. Appl. No. 10/643,417, filed Aug. 19, 2003.
Office Action dated Feb. 3, 2010, 43 pages, U.S. Appl. No. 10/857,287, filed May 27, 2004.
Final Office Action dated May 25, 2010, 55 pages, U.S. Appl. No. 11/181,154.
Examiner's Answer dated Jun. 8, 2010, 21 pages, U.S. Appl. No. 11/248,342, filed Oct. 12, 2005.
Upside Software, Inc., Using Upside Contract's workflow Engine to Improve Business Processes (Nov. 2004), pp. 1-2. Accessed from www.upsidesoft.com/upside+software/.../BP%20Workflow%20FINAL%20110404.pdf.
Final Office Action dated Jun. 16, 2010, 58 pages, U.S. Appl. No. 11/038,598, filed Jan. 19, 2005.
Pyron, Tim, "Sams Teach Yourself Microsoft® Project 2000 in 24 Hours," Safari Books Online, May 4, 2000, http://proquest.safaribooksonline.com/0-672-31814-8, 6 pages.
Office Action dated Jun. 24, 2010, 45 pages, U.S. Appl. No. 10/643,417, filed Aug. 19, 2003.
Office Action dated Jul. 1, 2010, 37 pages, U.S. Appl. No. 11/120,224, filed May 2, 2005.
Final Office Action dated Apr. 13, 2010, 49 pages, U.S. Appl. No. 10/643,418.
Advisory Action dated May 4, 2010, 3 pages, U.S. Appl. No. 11/120,224, filed May 2, 2005.
Office Action dated Feb. 1, 2011, U.S. Appl. No. 11/038,598, filed Jan. 19, 2005.
Final Office Action dated Mar. 30, 2010, 48 pages, U.S. Appl. No. 11/226,121, filed Sep. 14, 2005.
Office Action dated Mar. 7, 2012, U.S. Appl. No. 11/181,154, filed Jul. 14, 2005.
Decision on Appeal dated Apr. 25, 2012, U.S. Appl. No. 11/248,342, filed Oct. 12, 2005.
Russ, Melissa, et al., "A Software Development Process for Small Projects", IEEE Software, vol. 17, No. 5, pp. 96-101, Sep./Oct. 2000.
Final Office Action dated Feb. 24, 2010, 27 pages, U.S. Appl. No. 11/120,224, filed May 2, 2005.
Examiner's Answer dated May 12, 2011, U.S. Appl. No. 11/120,224, filed May 2, 2005.
Babar, Muhammad Ali, et al., "An Industrial Case of Exploiting Product Line Architectures in Agile Software Development," ACM SPLC, 2009, pp. 171-179.
Dossani, Rafiq, et al., "The Internet's Role in Offshored Services: A Case Study of India," ACM Transactions on Internet Technology, vol. 7, No. 3, Article 15, Publication date Aug. 2007, 21 pages.
Unphon, Hataichanok, "Making Use of Architecture Throughout the Software Life Cycle—How the Build Hierarchy can Facilitate Product Line Development," IEEE Shark, May 2009, pp. 41-48.
Yalaho, Anicet, et al., "A Conceptual Process Framework for It-Supported International Outsourcing of Software Production," Department of Computer Science and Information Systems, 2005, pp. 1-10.
Advisory Action dated Jul. 21, 2010, 11 pages, U.S. Appl. No. 10/643,418.
Notice of Allowance dated Jul. 16, 2010, 26 pages, U.S. Appl. No. 10/857,287, filed May 27, 2004.
Notice of Allowance dated Dec. 15, 2010, U.S. Appl. No. 10/643,417, filed on Aug. 19, 2003.
Final Office Action dated Nov. 22, 2010, U.S. Appl. No. 11/120,224, filed May 2, 2005.
Advisory Action dated Aug. 31, 2010, 3 pages, U.S. Appl. No. 11/038,598, filed Jan. 19, 2005.
Advisory Action dated Jan. 2, 2013, U.S. Appl. No. 11/181,154, filed Jul. 14, 2005.
Notice of Allowance dated Mar. 5, 2013, U.S. Appl. No. 11/181,154, filed Jul. 14, 2005.
Final Office Action dated Oct. 11, 2012, U.S. Appl. No. 11/181,154, filed Jul. 14, 2005.
Advisory Action dated Dec. 8, 2009, 2 pages, U.S. Appl. No. 10/857,287, filed May 27, 2004.

* cited by examiner

METHOD FOR DISCOVERING FUNCTIONAL AND SYSTEM REQUIREMENTS IN AN INTEGRATED DEVELOPMENT PROCESS

CROSS-REFERENCE TO RELATED APPLICATIONS

This application is related to and claims priority from U.S. Provisional Application Ser. No. 60/404,824, filed Aug. 19, 2002 and entitled "Enterprise Architecture Development Process" and is related to and claims priority from U.S. patent application Ser. No. 10/429,615, filed May 5, 2003 and entitled "Defining and Sizing Feasible Approaches to Business Needs within an Integrated Development Process" both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the use of consistent checkpoints in the process of enterprise-wide software development to allow significant events to occur in a predictable, scheduled manner. More specifically, methods are provided that facilitate the discovery of functional and system requirements in an integrated development process.

BACKGROUND OF THE INVENTION

The rapid evolution of computer and communication technologies coupled with the robust economies of the 1980s and 1990s resulted in unprecedented growth in the information technology field. In a growth economy, the need to establish a competitive advantage drove companies to faster and faster rates of change to support new product offerings and expanded services. As a result of these market pressures and time constraints, many companies elected to support new products and services by adding additional back office systems. However, due to the lack of mature integration technologies, the new systems were connected to the existing IT systems by making direct connections to the software routines already in use. The vulnerability of this design is that a change in one system precipitates a "ripple effect" change in every system it connects with. Over time, this incremental stacking of software systems can result in an integration ceiling. That is, at a certain point, more effort is spent on the connections than on new functionality and further expansion becomes cost prohibitive.

In the late 1990s, new integration technologies emerged that made it possible to "loosely couple" applications so that systems are no longer directly connected. Thus, changes in one system would not cause a ripple effect in any other systems. The most notable of these technologies were Message Oriented Middleware (MOM), Publish and Subscribe messaging, and Object Request Brokers. These technologies enabled companies to re-architect their conglomeration of systems into an architecture that allows them to expand in a cost-effective manner. Such technologies that address the problem of integrating existing systems with new systems in an organized, efficient, and economically scaleable manner can be referred to collectively as Enterprise Application Integration (EM). Four components of EAT are typically defined: Framework, Methodology, Approach, and Service Delivery. Frameworks depict and define relationships between Enterprise Architectures, such as Business, Conceptual, and Process Architecture, and Enterprise Application Integration. Frameworks also describe the points where work products defined in any methodology must interface. Methodologies define the semantics and notation describing rules governing and relationships between work products in the context of a Framework. Approaches solve problems associated with a specific objective by delivering work products that are methodologically, and therefore architecturally, consistent. Service Delivery is the instantiation of an Approach in order to produce those work products necessary to solve a real-world problem in an efficient, repeatable manner.

A desired method of transforming a disparate grouping of systems that were incrementally cobbled together into a stable, extensible, and affordable "system of systems" is to engineer it through detailed analysis and design. The software engineering discipline that addresses EAI and the underlying integration issue is known as Enterprise Architecture. Architectural engineers typically realize architectures by specifying the components to be used (hardware, software, network, etc.); depicting how the components fit together (where and when in the process); clearly defining the interfaces and boundaries between components; setting guidelines and standards; and determining the layers, services, dependencies, and abstraction levels.

These engineering efforts are typically broken down into several subordinate areas each of which is focused on a specific integration area. The subordinate areas can be referred to as Platform Integration, Data Integration, Systems Integration, Business Process Integration, and Business Integration. The areas of integration are hierarchical and their ease of implementation and value are generally inversely proportional. That is, the areas at the beginning of the preceding list have the greatest ease of implementation and the lowest value to an enterprise while the areas at the end of the list have the least ease of implementation and the highest value to an enterprise.

The types of architecture disciplines are closely aligned with the types of integration problems, with "Enterprise Architecture" serving as the over-arching architecture domain. The architecture disciplines that can comprise Enterprise Architecture are Business Architecture, Conceptual Architecture, Process Architecture, Technical Architecture, Information Architecture, and Application Architecture. Business Architecture enables the enterprise to define its desired future by systematically exploring and capturing its unique purposes, goals, strategies, and objectives; outlining the fundamental structures, processes and capabilities needed to fulfill its strategic intent; documenting these in ways that can meaningfully guide and influence the organization; and providing a framework for comparing and selecting competing business alternatives.

Conceptual Architecture enables the business to evolve its current inadequate automated systems into its ideal future systems by creating blueprints (targets) that outline the desired form of ideal future systems; identifying patterns and leverage points across multiple projects to expose hidden synergy; advocating frameworks that isolate change, increase flexibility, reduce cost, and speed construction; and building individual project blueprints that meet immediate needs while creating future opportunities.

Process Architecture enables the business to convert desired business concepts into clear, actionable solution specifications by documenting and clarifying the business requirements that must be fulfilled; defining conceptual solutions that convert business requirements into systems requirements; and clearly documenting the sequence and content of systems interactions required to create solutions.

Technical Architecture helps the business make wise choices in selecting and applying software tools and technologies by tracking industry trends in software technology, evaluating and recommending software that is applicable broadly across the enterprise, monitoring the evolution of key software used within the enterprise and advising on needed changes, and building consensus on the appropriate use of software technology within the business.

Information Architecture enables the enterprise to effectively organize and leverage its data resources by defining the key information assets owned by and available to the business; creating the processes, frameworks, and tools needed to fully leverage data as a corporate asset; and providing the technical expertise needed to apply and support database technology across the business.

Application Architecture defines the applications required to support the business functions and manage the information within the business environment by identifying candidate applications and their data stores needed to support the business function; based on all business, functional and system requirements, creating application definitions that describe what each of the applications should perform; identifying the business functions that are directly supported or performed by each application; and relating each application in the application architecture to existing systems.

For each type of integration problem area being addressed, a corresponding Enterprise Architecture discipline is typically needed. In some cases, a single Enterprise Architecture discipline can deal with multiple integration areas. Whether the various disciplines are assigned to a centralized Enterprise Architecture organization or are matrix managed is dependent on the constraints of the parent IT organization.

SUMMARY OF THE INVENTION

An embodiment of the invention is a method for developing a response to a business need that has been initially reduced to a concept and approved for additional development after an initial estimate. The method can consist of capturing functional requirements to implement the defined concept through interaction with end users of the potentially impacted business processes. After the functional requirements have been captured, system requirements, including requirements for potential automation and software systems supporting the impacted business processes, can be captured. System requirements can be captured through interaction with systems development analysts for the potentially impacted automation and software systems supporting the impacted business processes. A set of business requirements can be identified with respect to the approved concept and every captured functional requirement can be mapped to at least one or to only one identified business requirement. Every captured system requirement can be mapped to at least one or to only one captured functional requirement. After the system requirements have been captured, the sequence of events exchanged between applications can be modeled, the interfaces between applications and between applications and brokers can be modeled, and the data attributes to be exchanged between applications and between applications and any datastores can be modeled. Any or all of these modeling steps can be done prior to performing coding for any of the applications.

An alternative embodiment is a method for developing a response for a business need. The method can consist of completing an initial concept phase that defines the concept scope and initially approves the concept for entry into a development pipeline, capturing functional requirements to implement the defined concept, capturing system requirements for potential automation and software systems supporting the impacted business processes, and developing at least two solutions as alternatives for responding to the business need as defined in the concept where each solution comprises cost estimates and time estimates to implement the solution. The solutions can consist of a fully automated approach and a partially automated approach or of an initially complete implementation and a phased implementation. The solutions can also be selected from the group comprising a commercial off-the-shelf solution, an internally developed solution, and a mixed solution of both commercial off-the-shelf components and internally developed components. Alternatively, the solutions can consist of a first commercial off-the-shelf solution and a second alternative commercial off-the-shelf solution. The solution can also be divided into logical grouping of phases that can be implemented over time.

Another alternative embodiment is a method for capturing the functional requirements to implement a defined concept. The method can consist of modeling existing (or even proposed) functional workflows for business processes potentially impacted by the concept, meeting with at least one user of each potentially impacted business process, explaining the concept, proceeding through the modeled workflows step-by-step with the users to identify the changes required, and capturing the required changes as functional requirements for implementing the concept. The step of identifying the required changes can further consist of identifying changes that would be beneficial but not required. The meeting with users of each potentially impacted business process can consist of meeting with such users in a collective meeting or in separate meetings for each potentially impacted business process. After the functional requirements have been captured, system requirements can be captured for potential automation and software systems supporting the impacted business processes through interaction with systems analysts for the potentially impacted automation and software systems supporting the impacted business processes. After the system requirements have been captured, the sequence of events exchanged between applications can be modeled, the interfaces between applications and between applications and brokers can be modeled, and the data attributes to be exchanged between applications and between applications and any datastores can be modeled, all prior to performing coding (and in some embodiments even before full-scale design and development) for any of the applications.

DETAILED DESCRIPTION OF THE PREFERRED EMBODIMENTS

An Enterprise Development Process (EDP) can be employed to facilitate the integration of enterprise architecture. An Enterprise Development Process is described in U.S. Provisional Application Ser. No. 60/404,824, filed Aug. 19, 2002 and entitled "Enterprise Architecture Development Process", which is incorporated herein by reference. EDP provides rigor to the process of enterprise-wide software development. Consistent checkpoints throughout the process allow significant events to occur in a predictable, scheduled manner. The EDP process typically comprises six phases: Define, Discover, Design, Develop, Deploy, and Demand. The present application addresses the Discover phase.

The Define phase, described in the aforementioned co-pending U.S. Patent Application Ser. No. 60/404,824, is typically the first phase in the EDP process. The Define phase encompasses processes that define the business intent and concepts that are aligned with the business intent. Problems are defined by describing what a business wants in the context of mission, goal, objective, and capability models. The problem statements are then translated into concepts that can be detailed in a concept document. As used herein, the term "concept document" does not necessarily refer only to a printed document but can in general refer to any collection of information. For example, the concept document can be stored as a single computer file or as a set of computer files accessible as a whole from a single interface. In an embodiment, the concept document is a Concept Analysis Review Document (CARD), described in detail in the aforementioned co-pending U.S. Patent Application Ser. No. 60/404,824. The CARD can serve as both a guide to collecting information pertinent to a problem and a repository for information that has been collected. When a business need has been identified (typically and preferably, but not necessarily, by the business unit rather than the IT group) and documented in the concept document, a determination of technical approach, critical functional impacts, impacted systems, and overall feasibility of concepts takes place. A final step in the Define phase aids with prioritization and investment decisions by facilitating estimation of the level of effort likely to be needed to complete a project.

The Discover phase typically follows the Define phase. The Discover phase refers to the processes that help discover functional and system requirements in support of business requirements. The Discover phase facilitates a "process-driven" approach to requirements definition. The analysis conducted in the Discover phase verifies the business processes envisioned and elicits all the requirements of a project. These requirements are documented in a centralized repository along with the business and system process models, thus enabling traceability and reuse. In the preferred embodiment a centralized requirements repository is used to track the requirements for all projects within a business group, a domain, or even within the enterprise. In an alternative embodiment, the requirements for a given project may be captured in a Requirements Document. Additionally, the information stored in a centralized repository may also reasonably be viewed as constituting a set of Requirements Documents for the projects reposited there. As a by-product of the Discover phase analysis, it is possible to automatically generate interfaces as well as test workflows and test cases. These automation capabilities shorten the test window and overall project cycle time.

The Discover phase typically comprises four steps: Functional Requirements Modeling (FRM), System Requirements Modeling (SRM), Application Integration Modeling (AIM), and a Contract development and approval procedure. FRM establishes a common understanding of any new business processes impacted by the project, seeks approval from a project sponsor regarding the scope of the project, and captures the functional requirements associated with a project. Each functional requirement typically maps to one or more business requirements. Within the FRM step, several activities can occur. First, resource planning can be conducted in which the scope of a project, the business requirements, impacted processes, a schedule, and resource assignments are determined. Next, the functional requirements can be modeled by modeling impacted functional work flows, capturing functional requirements, mapping functional requirements to business requirements, and/or capturing assumptions and issues. At this point, the functional requirements may be stored in a centralized repository and in some instances a Requirements Document containing this information can be created. In the Define phase an Architecture Blueprint is sometimes created to describe the architecture to be used in the course of a project. If an Architecture Blueprint exists, it can be updated at this point. Finally, the scope of analysis can be validated and a course of action can be determined, if necessary, with the consent of a project's sponsor.

Figure 1:
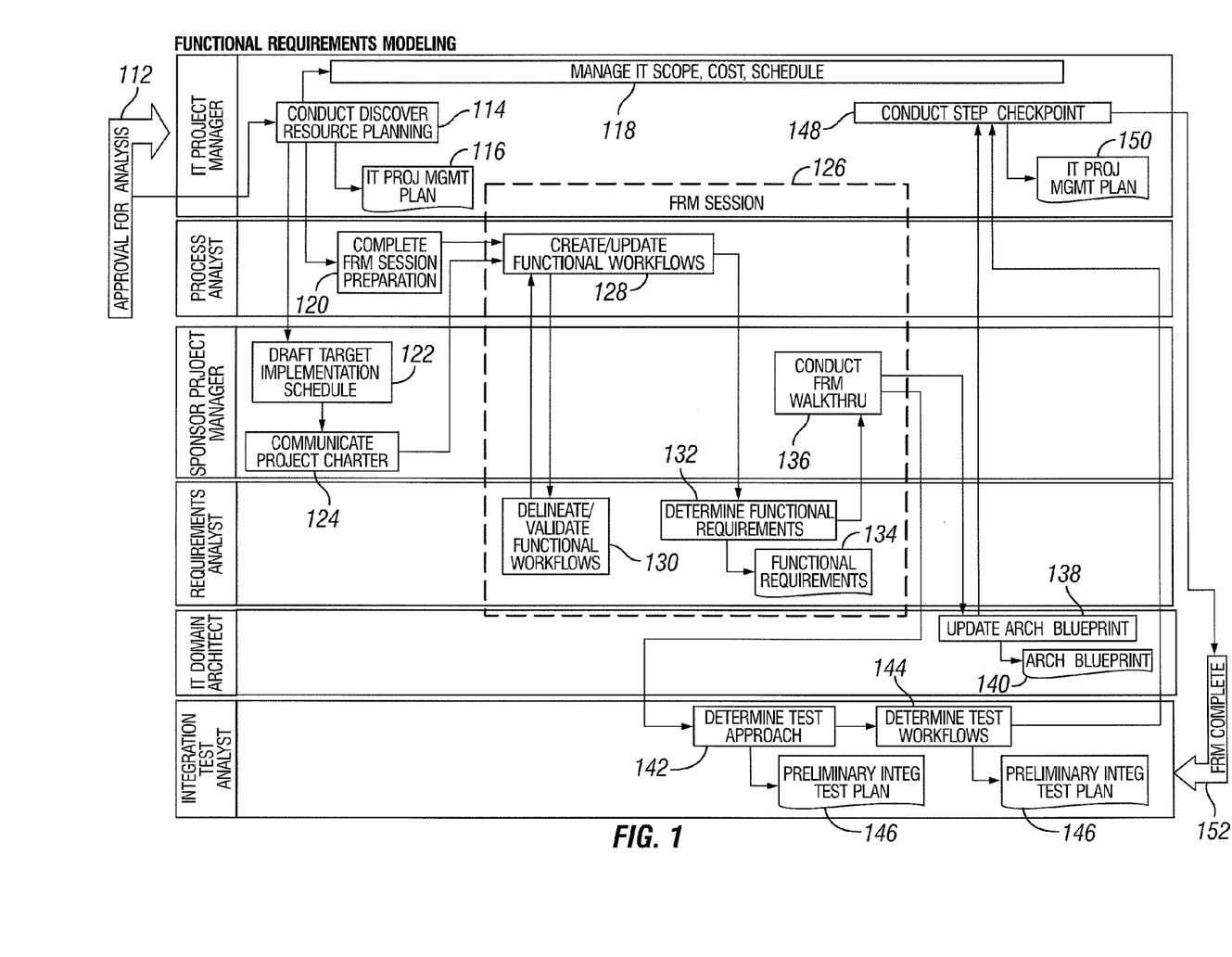
FIG. 1 is a block diagram depicting an embodiment of the Functional Requirements Modeling step.

An embodiment of the FRM process is illustrated in FIG. 1. After a concept has been approved for analysis in box 112, an IT Project Manager conducts resource planning in box 114. This can include validating the scope of the concept such as the business requirements, the impacted processes, and the Architecture Blueprint. Also, an overall approach for the Discover phase and a schedule can be set, and resources for the analysis can be assigned at this point. An IT Project Management Plan document 116 is the output of the resource planning. In box 118, the IT Project Manager manages the IT scope, cost, and schedule throughout the course of the FRM process. A Process Analyst completes preparation for an FRM session in box 120. A Sponsor Project Manager drafts a target implementation schedule in box 122 and communicates a project charter in box 124. When the FRM session preparation is complete and the project charter has been communicated, an FRM session can be held in box 126. Within the FRM session the Process Analyst creates or updates functional workflows in box 128. A Requirements Analyst delineates or validates the functional workflows in box 130 and determines the functional requirements in box 132. This can include modeling and reviewing impacted functional workflows; capturing pertinent functional requirements such as user requirements, network and business requirements, testing requirements, and security requirements; mapping functional requirements to business requirements; capturing assumptions and issues; and demonstrating the capabilities of commercial off-the-shelf products and prototypes, if applicable. Functional Requirements 134 are the output of this step. The requirements are captured in a central repository and may be placed in a Requirements Document (which may itself be stored in and/or generated from a central repository) describing the functional requirements. After the functional requirements have been determined the Sponsor Project Manager conducts an FRM walkthrough in box 136 as the last step in the FRM session. This can involve a facilitator systematically walking subject matter experts and representatives of impacted IT systems through each business process segment until the impacted business processes have been modeled in their future state.

Where there is an Architecture Blueprint, an IT Domain Architect updates the Architecture Blueprint in box 138, with the updated Architecture Blueprint document 140 as the output. When the FRM session is complete, an Integration Test Analyst determines a test approach in box 142 and determines a test workflow in box 144. A Preliminary Integrated Test Plan document 146 can be the output of either of these steps. After the Architecture Blueprint has been updated and the test workflows have been determined, the IT Project Manager conducts a step checkpoint in box 148. An updated IT Project Management Plan document 150 is the output of this step. The FRM process can then be considered complete as shown on box 152.

System Requirements Modeling (SRM) defines the requirements for potential automation and software systems that support business processes. SRM establishes the project's inter-system process flows, ensures that every system requirement (such as licenses, middleware, etc.) is in support of and mapped to one or more functional requirements, and captures all the system requirements associated with a project. As with FRM, several activities can occur within the SRM step. First, the system requirements can be modeled by modeling impacted system work flows, capturing system requirements, mapping system requirements to functional requirements, and/or validating requirements against IT and network architecture. At this point, a centralized repository for requirements can be updated with the system requirements and the Architecture Blueprint can be updated with information architecture, technical architecture, and application architecture information. Next, the scope of analysis can be validated, a course of action can be determined if necessary, the consent of a project's sponsor can be gained, and major issues can be resolved. Built in to the process is an option to provide alternative solutions to the business problem. This may include, but is not limited to, alternative approaches such as full automation vs. manual/automation mix, integration of commercial off-the-shelf products, and phased approaches to implementation. When several options exist, estimated levels of effort may be determined to aid with selection of an option. In this manner a set of packages offering alternative costs vs. time to implementation vs. functionality may be offered for the business decision makers to strike the most appropriate balance. At the end of the SRM step, a walkthrough of the system process flows and requirements can be conducted. At this point, the requirements can be baselined and versioned so that additions or changes to the requirements may be handled through a change request process.

Figure 2:
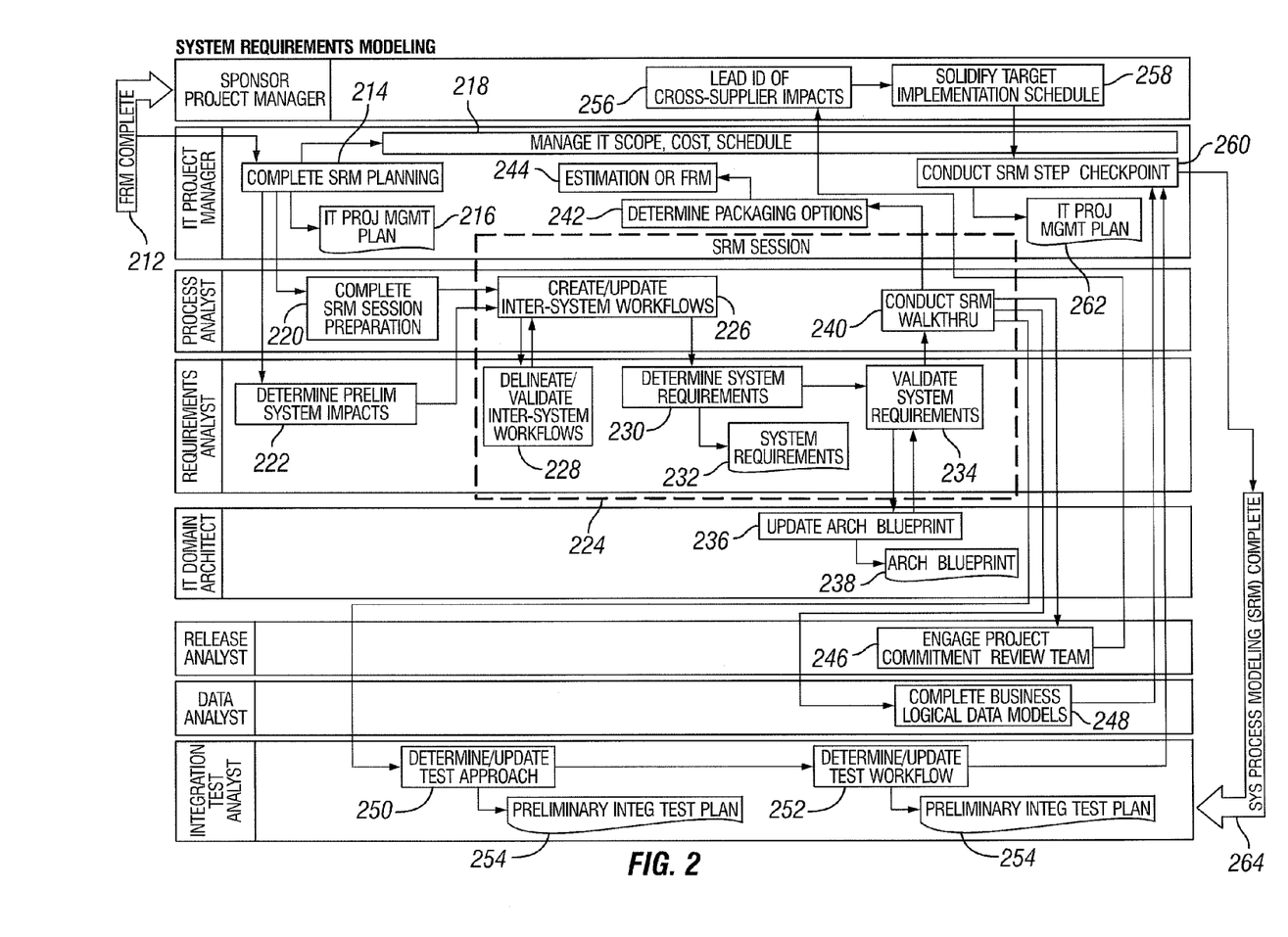
FIG. 2 is a block diagram depicting an embodiment of the System Requirements Modeling step.

An embodiment of the SRM process is illustrated in FIG. 2. After the FRM process is complete in box 212, an IT Project Manager conducts SRM planning in box 214. An IT Project Management Plan document 216 is the output of the SRM planning. In box 218, the IT Project Manager manages the IT scope, cost, and schedule throughout the course of the SRM process. A Process Analyst completes preparation for an SRM session in box 220. In box 222, a Requirements Analyst determines the preliminary system impacts. When the SRM session preparation is complete and the preliminary system impacts have been determined, an SRM session can be held in box 224. Within the SRM session the Process Analyst creates or updates inter-system workflows in box 226. The Requirements Analyst delineates or validates the inter-system workflows in box 228 and determines the system requirements in box 230. The output of this step is System Requirements 232, which may be captured in a central repository. The Requirements Analyst then validates the system requirements in box 234. The steps shown in boxes 226, 228, 230, and 234 can include modeling and reviewing impacted system workflows, capturing system requirements, mapping system requirements to functional requirements, validating requirements against IT and network architecture, and demonstrating the capabilities of commercial off-the-shelf products and prototypes, if applicable. Where there is an Architecture Blueprint, an IT Domain Architect updates the Architecture Blueprint in box 236 with the Architecture Blueprint document 238 as the output. This can include information architecture, technical architecture, and application architecture. After the system requirements have been validated the Process Analyst conducts an SRM walkthrough in box 240 as the last step in the SRM session.

Next, in box 242, the IT Project Manager determines packaging options where alternative solutions are described. The IT Project Manager can perform estimation or further FRM processing in box 244. When the SRM session is complete, a Release Analyst engages a project commitment review team in box 246, a Data Analyst creates a business logical data model in box 248, and, in some embodiments, an Integration Test Analyst determines or updates a test approach in box 250 and determines or updates test workflows in box 252. A Preliminary Integrated Test Plan document 254 can be the output of the determination of either the test approach or the test workflows. After the project commitment review team has been engaged, a Sponsor Project Manager leads the identification of cross-supplier impacts in box 256 and solidifies a target implementation schedule in box 258. After the target implementation schedule has been solidified, the business logical data model has been created, and the test workflows have been determined, the IT Project Manager conducts an SRM step checkpoint in box 260. The output of this process is an updated IT Project Management Plan document 262. The SRM process can then be considered complete as shown in box 264.

In an example of the FRM and SRM steps of the Discover phase, a telecommunications company can be assumed to be organized according to the business domains described in the Telecom Operations Map (TOM) published by the Tele-Management Forum. In one example, the domains within the telecommunications company might be infrastructure buildout, customer acquisition, service delivery, revenue management, service assurance, and customer care. To enhance understanding, a simplistic example follows which illustrates the type of steps present in the process. The company might decide to offer a sales promotion such as providing a second, free frame relay when a first frame relay is purchased. When an idea such as this is first conceived, a CARD or similar concept document is filled out describing the proposed offering. The CARD then passes through the Define phase as described above and in more detail in the aforementioned co-pending U.S. Patent Application Ser. No. 60/404,824. If the concept as described in the CARD is approved, the Discover phase is then entered.

In FRM, the first step of the Discover phase, the impact of the concept on each of the TOM domains is analyzed. For example, when the impact of the two-for-one frame relay offer on the infrastructure buildout domain is analyzed, it might be determined that there would be no effect on the company's infrastructure based on the characteristics of the promotion described in the CARD. That is, such an offer would typically be made only in service areas where frame relay infrastructure already exists and where no new infrastructure would need to be built. The analysis of the effect of the offer on the customer acquisition domain might indicate that that domain would be impacted. New sales strategies, customer acquisition techniques, and creation of orders might need to be developed or enhanced that take into account the new sales offering. The service delivery domain would probably not be affected by the new offering since delivering two frame relays would not be significantly different from delivering one. The revenue management domain would be impacted because a billing department within that domain would need to ensure that customers are not billed for the second frame relay. The service assurance domain would not be impacted but it is possible that the customer care domain would be affected by the new offering.

When the resource planning and assignment is complete, operational and functional representatives of the potentially impacted domains are invited to a meeting. For purposes of this specification, the term "meeting" is not limited to a face-to-face gathering. Instead, a meeting can refer to any collective, collaborative communication, such as a conference phone call or a series of email messages, that occurs among the members of a group over a relatively short period of time. Continuing the above example, since it was determined that the customer acquisition, revenue management, and customer care domains would potentially be impacted by the proposed sales offering, only functional representatives from those impacted domains would attend the meeting and discuss how the proposal would affect their domains functionally. It should be noted that the attendees at this meeting deal with operations within their respective domains and are not systems-specific development analysts (referred to as systems analysts). Even if the proposed project has computer-related implications, it is only the end users and not the systems analysts who attend this meeting. This is in contrast with traditional development processes where computer systems personnel and users typically meet at the beginning of a project and jointly develop an application.

The functional representatives from the potentially affected domains record the operational impacts and functional requirements of the proposal in a centralized repository and/or a Requirements Document. The SRM step of the Discover phase can then begin. It is in this step that systems analysts become involved in the Discover process. The systems analysts use the information from FRM to determine which of the functional requirements established in the FRM step have system implications. The systems analysts then identify system requirements and ensure that the identified systems requirements support the functional requirements. The centralized requirements repository and/or the Requirements Document is updated with the appropriate system requirements throughout the SRM step.

Application and Integration Modeling (AIM) bridges the complexities of application, messaging, and information components into an integrated architecture that supports development, implementation, and maintenance of a flexible and robust IT infrastructure. The objective of the AIM step is to analyze, specify, and define the systems to be built. The requirements that were identified during the SRM step are the basis of the AIM step. The AIM step can include modeling the sequence of events exchanged between applications, modeling the interfaces between applications and between applications and brokers, and/or modeling the data attributes to be exchanged between applications and between applications and datastores. Any or all of these models are typically created before any coding occurs, where coding can be defined as the creation or modification of programming code for applications or the like. Thus, the models developed during the AIM step do not consider implementation details such as programming languages. AIM provides rigorous processes, methodologies, and tools to document and validate interfaces between enterprise applications and to support software development that involves application integration using brokers and middleware components. AIM also helps application programmers understand their responsibilities within functional and process areas.

Within the AIM step, an AIM session can be held in which application integration is modeled. System interfaces can be modeled and reviewed and Interface Control Documents (ICDs) can be created in the AIM session. An ICD identifies the sequence of events exchanged between applications, detailed interfaces between applications and between applications and brokers, data attributes that are exchanged between applications in the interfaces, and producers and consumers of data in an integrated information store. An application approach can then be determined in parallel with integration modeling. At this point, an Application Architecture Blueprint can be created. The Application Architecture Blueprint captures the high level approach for each application impacted by a project and serves as the source document for all requirements to be satisfied by an application. The Application Architecture Blueprint can be validated against the ICDs, the Architecture Blueprint, and any applicable network planning information. Next, the Architecture Blueprint can be updated if necessary. Finally, the scope of analysis can be validated, a course of action can be determined, resource reservations can be validated, the consent of a project's sponsor can be gained, and major issues can be resolved.

Figure 3:
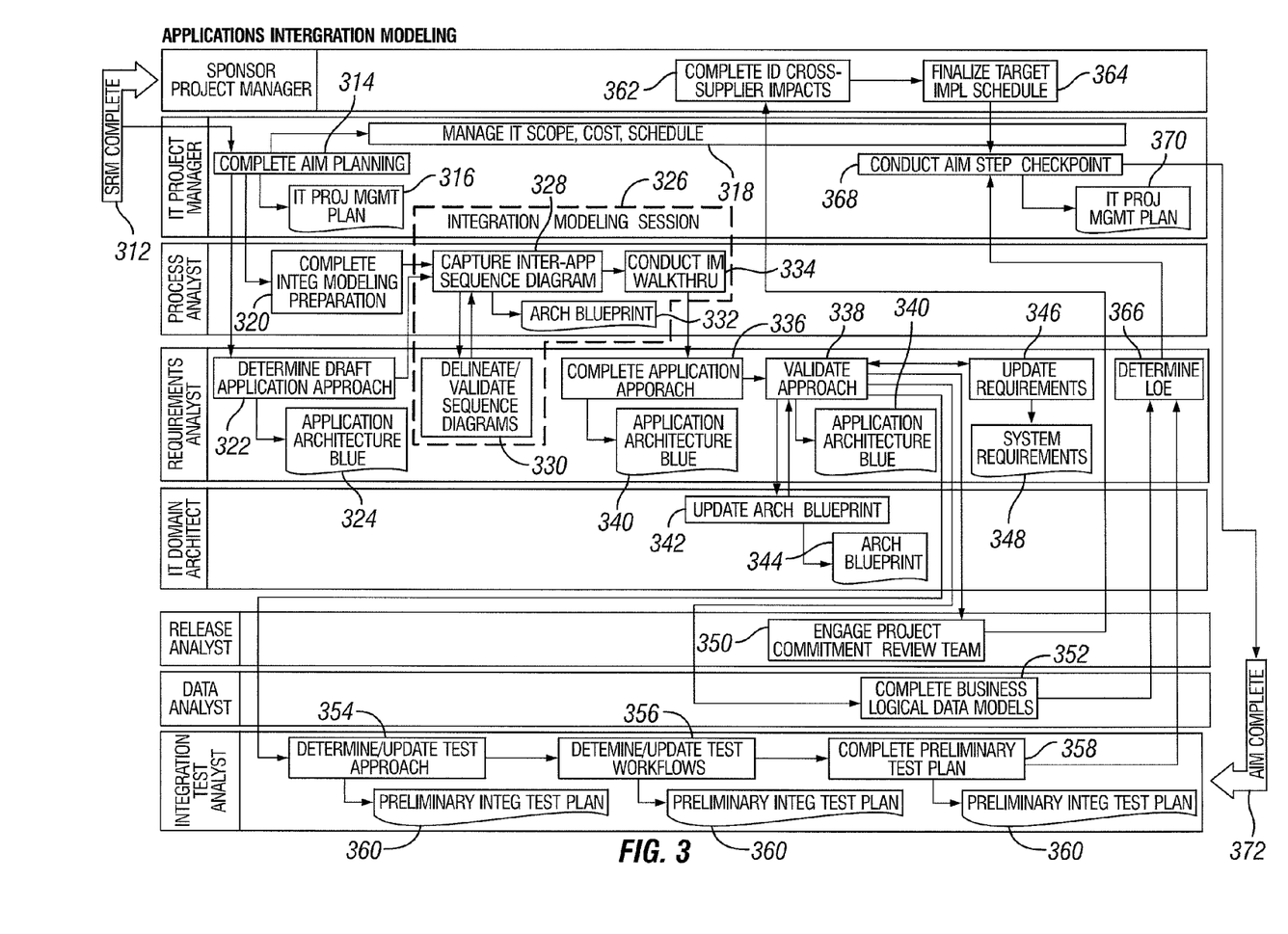
FIG. 3 is a block diagram depicting an embodiment of the Application Integration Modeling step.

An embodiment of the AIM process is shown in FIG. 3. After the SRM process is complete in box 312, an IT Project Manager conducts AIM planning in box 314. An IT Project Management Plan document 316 is the output of the AIM planning. In box 318, the IT Project Manager manages the IT scope, cost, and schedule throughout the course of the AIM process. A Process Analyst completes preparation for an integration modeling session in box 320. In box 322, a Requirements Analyst determines a draft application approach. An Application Architecture Blueprint document 324 is the output of this step. When the integration modeling session preparation is complete and the draft application approach has been determined, an integration modeling session can be held in box 326. Within the integration modeling session, the Process Analyst captures inter-application sequence diagrams in box 328 and the Requirements Analyst delineates or validates the sequence diagrams in box 330. These steps can include modeling and reviewing system interfaces when required (such as when brokers or integration information stores are impacted), creating Interface Control Documents (ICDs), and performing binding for all impacted applications. Where one exists, the Architecture Blueprint document 332 can be updated as a result of these processes. As the last step in the integration modeling session the Process Analyst conducts an integration modeling walkthrough in box 334.

Next, the Requirements Analyst completes an application approach in box 336. This can be done in parallel with integration modeling and includes reference to applicable ICDs. In box 338, the Requirements Analyst then validates the approach against the ICDs, the Architecture Blueprint, and network planning information. The Application Architecture Blueprint document 340 can be updated after either of these steps. After the approach is validated the Architecture Blueprint is updated in step 342, with the updated Architecture Blueprint document 344 as the output. The Requirements Analyst updates the system requirements in box 346, with a system requirements document 348 as the output. Next, a Release Analyst engages a project commitment review team in box 350, a Data Analyst completes a business logical data model in box 352, and, in some embodiments, an Integration Test Analyst determines or updates a test approach in box 354, determines or updates test workflows in box 356, and completes a Preliminary Integrated Test Plan in box 358. A Preliminary Integration Test Plan document 360 can be the output of any of the steps performed by the Integration Test Analyst. After the project commitment review team has been engaged, a Sponsor Project Manager completes an identification of cross-supplier impacts in box 362 and finalizes a target implementation schedule in box 364. After the business logical data models and the preliminary test plan have been completed, the Requirements Analyst determines a Level of Effort for the project in box 366. Next, the IT Project Manager conducts an AIM step checkpoint in box 368. An IT Project Management Plan document 370 is the output of this step. The AIM process can then be considered complete as shown in box 372.

The Contract development and approval procedure specifies the steps, timing, and approvals needed to produce a valid contract for a project. The contract is a formal agreement between the technology-related organizations (suppliers) that will carry out a project and the business-related organizations (sponsor) of the project regarding the scope, schedule, and cost of the project. The developed contract typically contains, either directly or by reference, the following information:

- an identification/project number and title of the project;
- the names of the sponsoring organizations;
- the names of the sponsoring organization project manager and the IT project manager for the project;
- a scope statement describing supplier's statement of work, referencing scope, cost and schedule;
- a scope section listing supplier's deliverables completed and baselined (this constitutes supplier's "build-to" scope);
- a cost section including human resources hours and any related $3^{rd}$-party hardware, software and vendor costs;
- a schedule section listing the supplier's delivery schedule and planned deliverables (this schedule should take into account all known dependencies with other suppliers or projects);
- a Dependencies, Issues, Assumptions section listing dependencies with other suppliers and/or projects, as well as summary of critical issues and assumptions, referencing other documents for detail, if necessary;
- a warranty section stating the agreed upon length of support through the warranty period;
- an expiration section indicating the date, after which the contract (scope, cost and/or delivery schedule) must be renegotiated if the development is not approved and resumed; and
- a signature section for the supplier and sponsoring project manager signatures.

Entry into the Contract development and approval procedure can occur when enough of the project scope, schedule, resource needs, and cost have been identified to allow a contract template to be completed. Contract development is complete when all sections of the contract template have been completed and accurately reflect the estimated cost, schedule, quality, and resource needs for the project.

Individuals affected by a contract typically approve the contract according to the following steps. First, a contract review meeting can be held in which directors of the IT organization directly or indirectly involved with the project are given an overview of the contract. The directors are then asked for their approval of the contract. Minutes of this meeting are published showing the approval or rejection of the contract by the directors. A director may explicitly identify an approval agent who may then give approval of the contract for the director. The contract is then submitted to the sponsoring organization for review and approval. Approval of the contract by the sponsoring organization is requested only after all supplier organizations such as IT have given approval. In some embodiments, a deadline can be set specifying when the approvals need to be returned. When design work has started without an approved contract, a stop work order is typically issued if the contract expiration date passes and the contract has not yet been approved.

The Contract development and approval procedure is considered complete when one of two outcomes occurs. First, the contract can be approved by the sponsoring organization. Second, approval of the contract can be denied, effectively canceling all further work by the suppliers on the project. In either case, the contract itself, all approval or rejection correspondence, and all supporting documentation are stored in the project repository.

Figure 4:
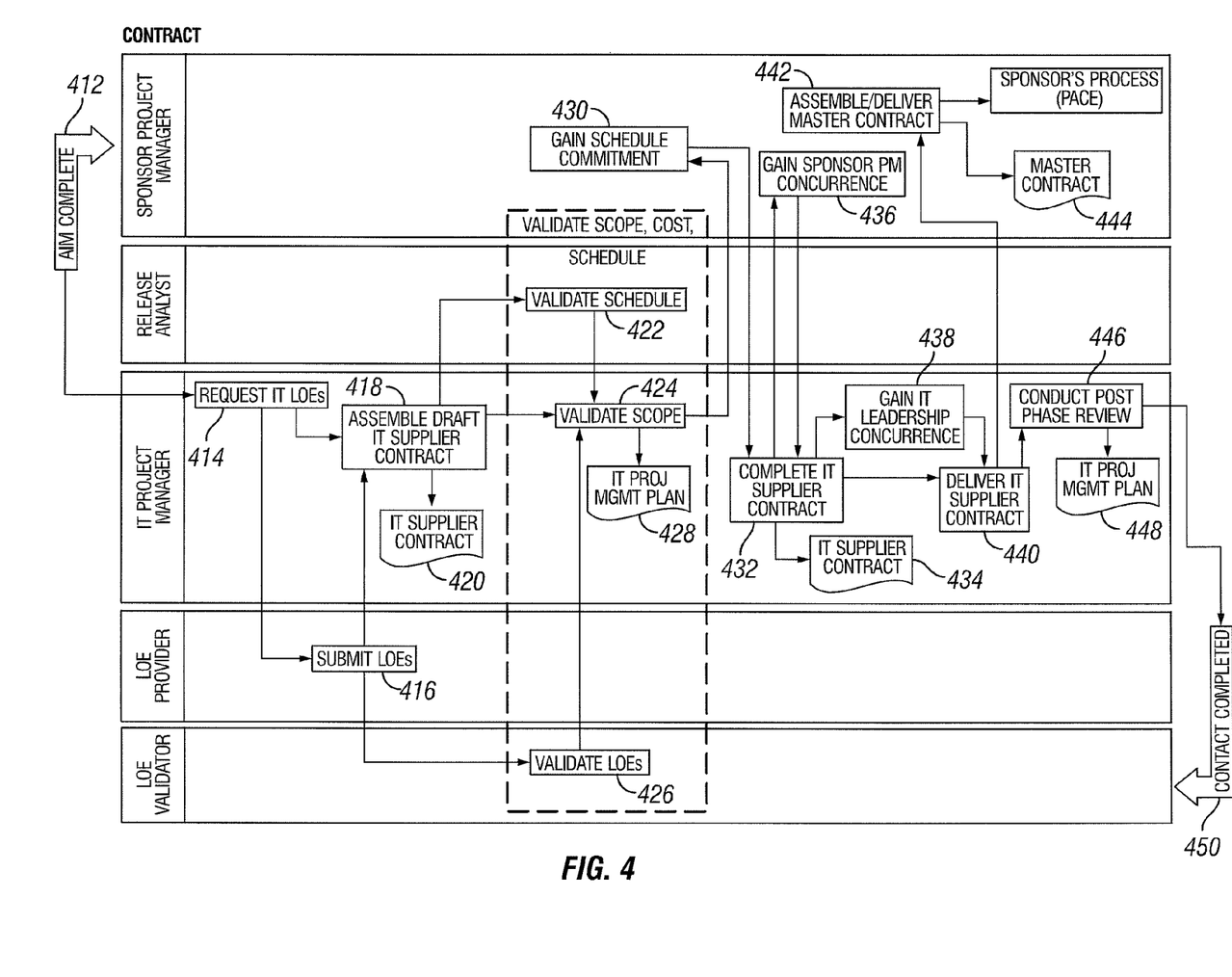
FIG. 4 is a block diagram depicting an embodiment of the Contract Development Procedure.

An embodiment of the Contract development and approval procedure is illustrated in FIG. 4. After the AIM process is complete in box 412, an IT Project Manager requests IT Levels of Effort (LOEs) in box 414. LOE providers submit their LOEs in box 416. The IT Project Manager assembles a draft IT Supplier Contract in box 418 and an IT Supplier Contract document 420 is the output of this step. It typically incorporates a scope of deliverables, a schedule, and a cost (LOE). After the draft IT Supplier Contract has been assembled, an internal IT review is conducted wherein an IT team can review and sign off on the contract. This can include a Release Analyst validating the schedule in box 422, the IT Project Manager validating the scope in box 424, and an LOE validator validating the LOEs in box 426. An IT Project Management Plan document 428 is the output of the scope validation step. After the scope has been validated, the contract is offered to the sponsor and a Sponsor Project Manager commits to the schedule in box 430. The IT Project Manager then completes the IT Supplier Contract in box 432, with a final IT supplier contract document 434 as the output. The Sponsor Project Manager provides concurrence with the contract in box 436. The IT Project Manager gains the concurrence of the IT leadership, if necessary, in box 438 and, in box 440, delivers the IT supplier contract. The Sponsor Project Manager then assembles and delivers a Master Contract in box 442, with a Master Contract document 444 as the output. The IT Project Manager then conducts a post phase review in box 446, with the updated IT Project Management Plan document 448 as the output. The Contract development and approval procedure is then considered complete as shown in box 450.

To assist in the Discover phase, process architects can use a process modeling tool such as the Corp Modeler produced by CASEwise Corporation to capture the business and system processes. A tool such as Rational Rose produced by Rational Corporation can be used in the AIM step to document the system interfaces. A requirements repository tool such as DOORS produced by Telelogic can be used to store all requirements. Additionally, a validator tool can be used to ensure consistency between systems that produce data and systems that consume data.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for developing a response to a business need which has been initially reduced to a concept and approved for additional development after an initial estimate, wherein a set of business requirements has been identified with respect to the approved concept, comprising:

capturing, with a requirements repository tool stored on a computer readable storage medium and executed by a processor, functional requirements by interacting with end-users of business processes potentially impacted by the concept, wherein the functional requirements are functional requirements to implement the concept, and wherein the business processes are business processes of the business;

mapping every captured functional requirement to at least one business requirement in the set of business requirements;

determining a test approach after capturing the functional requirements;

automatically generating test workflows and test cases based on the test approach;

capturing, with the requirements repository tool, system requirements by interacting with systems development analysts for potentially impacted automation and software systems supporting the impacted business processes, wherein the system requirements are system requirements for potential automation and software systems that support the functional requirements, and wherein the capturing the system requirements is performed after completion of capturing and mapping the functional requirements;

mapping every captured system requirement to at least one captured functional requirement;

modeling, with a universal modeling language tool stored on a computer readable storage medium and executed by a processor, inter-system workflows for the potential automation and software systems based on the system requirements prior to performing coding for any applications, wherein the modeling of inter-system workflows is performed after completion of capturing the system requirements;

updating the test approach after capturing the system requirements; and updating the test workflows based on the updated test approach and generating a preliminary integrated test plan document.

2. The method of claim 1, wherein capturing the functional requirements further comprises:

modeling, with a process modeling tool stored on a computer readable storage medium and executed by a processor, functional workflows of the business processes currently existing that are potentially impacted by the concept, and meeting with at least one of the end-users of each of the potentially impacted business processes, explaining the concept, and proceeding through the modeled functional workflows step-by-step with the at least one of the end-users and identifying the changes required to the functional workflows to implement the concept, and capturing the identified changes to the functional workflows as the functional requirements.

3. The method of claim 2, wherein the at least one of the end-users of each of the potentially impacted business processes includes functional users and does not include system analysts of the potentially impacted business processes.

4. The method of claim 3, wherein the inter-system workflows are used as roadmaps to identify changes to the potential automation and software systems' functionality.

5. The method of claim 4, wherein identified changes to the potential automation and software systems' functionality comprise the system requirements.

6. The method of claim 5, further comprising:

developing at least two solutions for providing the captured system requirements as alternatives for the response to the business need as defined in the concept, wherein each solution comprises cost estimates and time estimates to implement the solution.

7. The method of claim 6, wherein the at least two solutions comprise:
a fully automated approach; and
a partially automated approach.

8. The method of claim 6, wherein the at least two solutions comprise:
an initially complete implementation; and
a phased implementation.

9. The method of claim 6, wherein the at least two solutions are selected from the group comprising:
a commercial off the shelf solution;
an internally developed solution; and
a mixed solution comprising commercial off the shelf components and internally developed components.

10. The method of claim 6, wherein the at least two solutions comprise:
a first commercial off the shelf solution; and
a second alternative commercial off the shelf solution.

11. The method of claim 6, wherein each of the at least two solutions provides a distinct set of functionality enabled by the solution.

12. The method of claim 1, wherein every captured functional requirement is mapped to only one identified business requirement.

13. The method of claim 1, wherein every captured system requirement is mapped to only one captured functional requirement.

14. The method of claim 1, wherein:
modeling, with the universal modeling language tool, inter-system workflows for the potential automation and software systems further comprises modeling a sequence of events exchanged between applications prior to performing coding for any of the applications, wherein the modeling the sequence of events is performed after completion of capturing the system requirements.

15. The method of claim 1, further comprising:
modeling, with the universal modeling language tool, interfaces between applications and between applications and brokers prior to performing coding for any of the applications, wherein the modeling the interfaces is performed after completion of capturing the system requirements.

16. The method of claim 1, further comprising:
modeling, with the universal modeling language tool, data attributes that are exchangeable between applications and between applications and any datastores prior to performing coding for any of the applications, wherein the modeling the data attributes is performed after completion of capturing the system requirements.

17. The method of claim 1, further comprising:
modeling, with the universal modeling language tool, a sequence of events exchanged between applications, modeling, with the universal modeling language tool, interfaces between applications and between applications and brokers, and modeling, with the universal modeling language tool, data attributes exchangeable between applications and between applications and any datastores, all prior to performing coding for any of the applications and all after completion of capturing the system requirements.

18. The method of claim 2, wherein the functional workflows are used as roadmaps to determine changes to the existing business processes.

19. The method of claim 2, wherein the step of identifying the changes required further comprises identifying changes which would be beneficial but not required.

20. The method of claim 2, wherein meeting with the at least one of the end-users of each of the potentially impacted business processes comprises meeting with such end-users in a collective meeting.

21. The method of claim 2, wherein meeting with the at least one of the end-users of each of the potentially impacted business processes comprises meeting in separate meetings for each of the potentially impacted business processes.

* * * * *